United States Patent
Iwasa et al.

(10) Patent No.: US 8,920,890 B2
(45) Date of Patent: Dec. 30, 2014

(54) LABEL FOR IN-MOLD FORMING AND RESIN CONTAINER WITH THE LABEL

(75) Inventors: Yasuo Iwasa, Kamisu (JP); Masaki Shiina, Kamisu (JP); Takatoshi Nishizawa, Kamisu (JP)

(73) Assignee: Yupo Corporation, Tokyo (JP)

( * ) Notice: Subject to any disclaimer, the term of this patent is extended or adjusted under 35 U.S.C. 154(b) by 872 days.

(21) Appl. No.: 11/700,050

(22) Filed: Jan. 31, 2007

(65) Prior Publication Data
US 2008/0182117 A1 Jul. 31, 2008

(51) Int. Cl.
| | |
|---|---|
| B29D 22/00 | (2006.01) |
| B32B 27/32 | (2006.01) |
| B29C 55/06 | (2006.01) |
| B29C 55/02 | (2006.01) |
| B29C 55/08 | (2006.01) |
| B29C 49/24 | (2006.01) |
| B29C 51/16 | (2006.01) |
| B29K 23/00 | (2006.01) |
| B29L 31/00 | (2006.01) |

(52) U.S. Cl.
CPC ............ B29C 55/06 (2013.01); B29C 55/023 (2013.01); B29C 55/08 (2013.01); B32B 27/32 (2013.01); B29C 49/24 (2013.01); B29C 51/16 (2013.01); B29C 2049/2412 (2013.01); B29K 2023/06 (2013.01); B29K 2023/083 (2013.01); B29K 2023/12 (2013.01); B29L 2031/744 (2013.01)
USPC ...................................... 428/35.7; 428/521

(58) Field of Classification Search
USPC ................................. 428/521, 35.7
See application file for complete search history.

(56) References Cited

U.S. PATENT DOCUMENTS

| | | | | |
|---|---|---|---|---|
| 4,726,999 | A | * | 2/1988 | Kohyama et al. ............. 428/516 |
| 4,986,866 | A | | 1/1991 | Ohba et al. |
| 5,332,542 | A | | 7/1994 | Yamanaka et al. |
| 5,811,163 | A | | 9/1998 | Ohno et al. |
| 6,726,969 | B1 | | 4/2004 | Balaji et al. |
| 2002/0050319 | A1 | * | 5/2002 | Nishizawa et al. ........... 156/245 |
| 2004/0161599 | A1 | * | 8/2004 | Nishizawa et al. ........... 428/327 |
| 2005/0191449 | A1 | * | 9/2005 | Funato et al. ................. 428/34.1 |
| 2005/0276943 | A1 | * | 12/2005 | Iwasa et al. .................. 428/35.7 |
| 2006/0040100 | A1 | * | 2/2006 | Nemoto et al. ............... 428/328 |
| 2006/0189762 | A1 | * | 8/2006 | Datta et al. .................... 525/240 |

OTHER PUBLICATIONS

Chinese Office Action issued Mar. 11, 2010, in counterpart Chinese Application No. 200810005224.6.
Chinese Office Action issued Jul. 27, 2010 in counterpart Chinese Application No. 200810005224.6.

* cited by examiner

*Primary Examiner* — James Yager
(74) *Attorney, Agent, or Firm* — Sughrue Mion, PLLC

(57) ABSTRACT

A label for in-mold forming which comprises a thermoplastic resin film base layer (I), a heat-sealable resin layer (II), and an antistatic layer (III), wherein the heat-sealable resin layer (II) comprises a heat-sealable resin including a copolymer of propylene and α-olefin having 4-20 carbon atoms and has a degree of non-crystallinity of 60-90% as determined with a differential scanning calorimeter (DSC) at temperatures less than 90° C., the antistatic layer (III) comprises an antistatic agent in an amount of 0.001 to 1 g per unit area ($m^2$) and the surface of the layer has a wettability index (JIS-K-6768) of 32-54 mN/m, and the label has a porosity higher than 10% and not higher than 70% and has an opacity (JIS-P-8138) higher than 20% and not higher than 100%; and a labeled container with the label.

22 Claims, No Drawings

LABEL FOR IN-MOLD FORMING AND RESIN CONTAINER WITH THE LABEL

BACKGROUND OF THE INVENTION

1. Field of the Invention

The present invention relates to a label for use in in-mold forming in which the label is set beforehand in a mold so that the printed side of the label comes into contact with the mold wall surface and a labeled container is produced by introducing a parison of a molten thermoplastic resin into the mold to conduct blow molding, by injection-molding a molten thermoplastic resin in the mold, or by subjecting a sheet of a molten thermoplastic resin to vacuum forming or pressure forming with the mold. The invention further relates to a resin container bearing the label, a process for producing the label, and a process for producing the labeled resin container.

2. Description of the Related Art

For integrally molding a labeled resin container, a process has been used which comprises inserting a blank or label into a mold beforehand and then molding a container in the mold by injection molding, blow molding, pressure-difference molding, foam molding, or the like to label the container for decoration, etc. (see JP-A-58-69015 and EP-A-254, 923). Known labels for use in such in-mold forming include resin films printed by gravure printing, synthetic papers printed by multicolor offset printing (see, for example, JP-B-2-7814 and JP-A-2-84319), and aluminum labels obtained by laminating a high-pressure-process low-density polyethylene, linear low-density polyethylene, ethylene/vinyl acetate copolymer, or ethylene/acrylic acid copolymer to the back side of an aluminum foil and printing the front side of the foil by gravure printing. Also known is a label which comprises a heat-sealable polyethylene resin layer having an antistatic layer on a surface thereof and having a specific value of wettability index and which is thus inhibited from arousing troubles attributable to electrostatic buildup in a label printing step and an in-mold forming step in a low-humidity environment, e.g., in winter (Japanese patent application No. 2004-151318).

However, the rate of container molding by the in-mold forming is being increased for the purpose of improving the productivity of the in-mold forming. Namely, the cooling time for cooling the resin container in the mold is being reduced and the temperature to which the mold is cooled is being lowered. In the case where the material of the container is a polyethylene resin, adhesion between the label and the container is relatively satisfactory. However, when the material of the container is a polypropylene resin, which is more transparent than polyethylene resins, then adhesion between the label and the container tends to be considerably low because of the low temperature to which the mold is cooled. This labeled container has drawbacks that the label readily peels off the container and has many blisters. There has hence been a problem that a high container loss results. The market for transparent containers comprising a polypropylene resin is growing because the amount and state of the contents thereof can be ascertained.

In the case where a polymer having a low melting point, such as, e.g., an ethylene/vinyl acetate copolymer or an ethylene/acrylic acid copolymer, is used as a heat-sealable resin in the label, relatively satisfactory adhesion to polypropylene containers is obtained. However, it has been pointed out that this label has a problem concerning suitability for filling with hot contents, i.e., the label readily peels off or slides when the temperature of the contents of the container is about 90° C.

SUMMARY OF THE INVENTION

An object of the invention is to provide a label for in-mold forming which has satisfactory suitability for printing, cutting, and punching even in a low-humidity environment, shows satisfactory adhesion under in-mold forming conditions including a polypropylene resin as a material for an adherend container, gives a labeled container inhibited from suffering blistering, and does not peel off the container even when the container is filled with high-temperature contents. Another object is to provide a resin container with the label.

The invention has the following constitutions.

1. A label for in-mold forming which comprises a thermoplastic resin film base layer (I), a heat-sealable resin layer (II), and an antistatic layer (III), wherein the heat-sealable resin layer (II) comprises a heat-sealable resin including a copolymer of propylene and α-olefin having 4-20 carbon atoms and has a degree of non-crystallinity of 60 to 90% as determined with a differential scanning calorimeter (DSC) at temperatures less than 90° C., the antistatic layer (III) comprises an antistatic agent in an amount of 0.001 to 1 g per unit area ($m^2$) and the surface of the layer has a wettability index (JIS-K-6768) of 32 to 54 mN/m, and the label has a porosity higher than 10% and not higher than 70% and has an opacity (JIS-P-8138) higher than 20% and not higher than 100%.

2. The label for in-mold forming as described under 1 above wherein the degree of non-crystallinity of the heat-sealable resin as determined with a differential scanning calorimeter (DSC) at temperatures less than 90° C. is 65 to 90%.

3. The label for in-mold forming as described under 1 or 2 above wherein the heat-sealable resin layer (II) thermally melts to label a container through the antistatic layer (III).

4. The label for in-mold forming as described under 3 above wherein the material of the container comprises a polypropylene resin.

5. The label for in-mold forming as described under any one of 1 to 4 above wherein the thermoplastic resin film base layer (I) is an uniaxially stretched resin film.

6. The label for in-mold forming as described under any one of 1 to 4 above wherein the thermoplastic resin film base layer (I) is a biaxially stretched resin film.

7. The label for in-mold forming as described under any one of 1 to 4 above wherein the thermoplastic resin film base layer (I) is a multilayered resin film comprising a biaxially stretched layer and a uniaxially stretched layer.

8. The label for in-mold forming as described under any one of 1 to 7 above wherein the heat-sealable resin layer (II) is a resin film which has been stretched at least uniaxially.

9. The label for in-mold forming as described under any one of 1 to 8 above wherein the surface of the heat-sealable resin layer (II) is embossed.

10. The label for in-mold forming as described under any one of 1 to 9 above which has a coat layer on the surface of the thermoplastic resin film base layer (I), the coat layer containing a pigment.

11. The label for in-mold forming as described under any one of 1 to 10 above wherein the surface of the thermoplastic resin film base layer (I) or the surface of the coat layer is subjected to an activation treatment.

12. The label for in-mold forming as described under any one of 1 to 11 above which has an antistatic layer formed on the surface of the thermoplastic resin film base layer (I) or on the surface of the coat layer.

13. The label for in-mold forming as described under 12 above wherein the antistatic layer formed on the surface of the thermoplastic resin film base layer (I) or on the surface of the coat layer comprises an antistatic agent in an amount of 0.001 to 10 g per unit area ($m^2$).

14. The label for in-mold forming as described under any one of 1 to 13 above wherein the antistatic agent comprises a polymeric antistatic agent.

15 The label for in-mold forming as described under any one of 1 to 14 above wherein the antistatic layer (III), the antistatic layer formed on the surface of the thermoplastic resin film base layer (I), or the antistatic layer formed on the surface of the coat layer is one formed by one or more coating techniques selected from the group consisting of die, bar, roll, gravure, spray, blade, air-knife, and size press coating.

16. The label for in-mold forming as described under any one of 3 to 15 above wherein a peel-off and misalignment of the label do not occur when the container with the label is filled with content of 90° C.

17. The label for in-mold forming as described under any one of 1 to 16 above which has at least either of holes and slits.

18. A labeled resin container, which is labeled with the label for in-mold forming as described under any one of 1 to 17 above.

19. The labeled resin container as described under 18 above wherein the container comprises a polypropylene resin.

20. A process for producing the label for in-mold forming as described under any one of 1 to 17 above which comprises producing the label for in-mold forming by a film-stretching method.

21. A process for producing the labeled resin container as described under 18 or 19 above which comprises producing the labeled resin container by a blow molding method.

DETAILED DESCRIPTION OF THE INVENTION

The label for in-mold forming of the invention will be further explained below in detail.
Thermoplastic Resin Film Base Layer (I)

The thermoplastic resin film base layer (I) to be used in the invention is a layer comprising a thermoplastic resin. Examples of the thermoplastic resin to be used as or in the base layer (I) include films of polyolefin resins such as propylene resins, high-density polyethylene, medium-density polyethylene, poly(methyl-1-pentene), and ethylene/cycloolefin copolymers, poly(ethylene terephthalate) resins, poly(vinyl chloride) resins, polyamide resins such as nylon-6, nylon-6,6, nylon-6,10, and nylon-6,12, ABS resins, and ionomer resins. Preferred are thermoplastic resins having a melting point in the range of 130-280° C., such as propylene resins, high-density polyethylene, and poly(ethylene terephthalate) resins. These resins may be used as a mixture of two or more thereof.

It is preferred that the thermoplastic resin as the main component should have a melting point higher by at least 15° C. than the melting point of the polyolefin resin constituting the heat-sealable resin layer (II). Preferred of such resins are propylene resins from the stand points of chemical resistance, cost, etc. The propylene resins include propylene homopolymers showing isotactic or syndiotactic stereoregularity and copolymers of propylene as the main component and one or more of α-olefins such as ethylene, buene-1, hexene-1, heptene-1, and 4-methylpentene-1. These copolymers may be bipolymers, terpolymers, or quadripolymers, and may be random copolymers or block copolymers.

Besides the thermoplastic resin, an inorganic fine powder and/or an organic filler is preferably incorporated into the thermoplastic resin film base layer (I). Examples of the inorganic fine powder include heavy calcium carbonate, lightweight calcium carbonate, calcined clay, talc, barium sulfate, diatomaceous earth, magnesium oxide, zinc oxide, titanium oxide, silicon oxide, a composite inorganic fine powder comprising hydroxyl-containing inorganic fine particles as cores, such as silica, and aluminum oxide or hydroxide surrounding the cores, and hollow glass beads. Examples thereof further include surface-treated powders obtained by treating such inorganic fine powders with various surface-treating agents. Of these, heavy calcium carbonate, lightweight calcium carbonate, calcined clay, and talc are preferred because they are inexpensive and bring about satisfactory moldability. Especially preferred is heavy calcium carbonate.

Examples of the organic filler include poly(ethylene terephthalate), poly(butylene terephthalate), polyamides, polycarbonates, poly(ethylene naphthalate), polystyrene, polymers and copolymers of acrylic or methacrylic esters, melamine resins, poly(ethylene sulfide), polyimides, poly (ethyl ether ketone), poly(phenylene sulfide), homopolymers of cycloolefins, and copolymers of a cycloolefin and ethylene. Of these, it is preferred to use a resin which has a higher melting point than the thermoplastic resin used for the base layer and is incompatible with the resin. In the case where a polyolefin resin is used for the base layer, it is preferred to use one or more members selected from poly(ethylene terephthalate), poly(butylene terephthalate), polyamides, polycarbonates, poly(ethylene naphthalate), polystyrene, homopolymers of cycloolefins, and copolymers of a cycloolefin and ethylene.

From the standpoint of a small calorific value in combustion, inorganic fine powders are preferred to organic fillers.

The average particle diameter of the inorganic fine powder to be used in the invention or the average dispersed-particle diameter of the organic filler to be used in the invention is preferably 0.01-30 μm, more preferably 0.1-20 μm, even more preferably 0.5-15 μm. The particle diameter thereof is preferably 0.01 μm or larger from the standpoint of ease of mixing with the thermoplastic resin. The particle diameter thereof is preferably 30 μm or smaller from the standpoint that the sheet, when stretched for forming voids therein and thereby improving printability, is less apt to suffer troubles such as breaking and a decrease in surface-layer strength.

The average particle diameter of the inorganic fine powder to be used in the invention can be determined in terms of the diameter of the particle corresponding to cumulative 50% (50%-cumulative particle diameter) as determined with, e.g., a particle analyzer such as laser diffraction type particle analyzer "Microtrac" (trade name; manufactured by Nikkiso Co., Ltd.). With respect to the particle diameter of an organic filler which has been dispersed in a thermoplastic resin by melt kneading and a dispersion operation, the particle diameter thereof may be determined by examining a section of the label with an electron microscope, measuring the diameters of at least ten particles, and averaging these particle diameters.

In the label of the invention, one member selected from those powders and fillers may be used alone or two or more thereof may be selected and used in combination. In the case of using a combination of two or more, this combination may comprise an inorganic fine powder and an organic filler.

When those fine powders/organic fillers are incorporated into a thermoplastic resin and the mixture is kneaded, additives can be added according to need, such as an antioxidant, ultraviolet stabilizer, dispersant, lubricant, compatibilizing agent, flame retardant, and coloring pigment. Especially when the label of the invention is to be used as a durable material, it is preferred to add an antioxidant, ultraviolet stabilizer, and the like. When an antioxidant is added, the amount of the antioxidant to be added is generally in the range of 0.001-1% by weight based on the thermoplastic resin. Specifically, a stabilizer such as a sterically hindered phenol compound, a phosphorus compound, or an amine compound can be used. When an ultraviolet stabilizer is used, it is used in an amount generally in the range of 0.001-1% by weight based on the thermoplastic resin. Specifically, a light stabilizer such as a sterically hindered amine, a benzotriazole compound, or a benzophenone compound can be used.

The dispersant and the lubricant are used, for example, for the purpose of dispersing an inorganic fine powder. The amount of the dispersant or lubricant to be used is generally in the range of 0.01-4% by weight based on the inorganic fine powder. Specifically, use can be made of a silane coupling agent, higher fatty acid such as oleic acid or stearic acid, metal soap, poly(acrylic acid), poly(methacrylic acid), salt of any of these, etc. In the case where an organic filler is used, the kind and amount of a compatibilizing agent are important because they govern the particle shape of the organic filler. Preferred examples of the compatibilizing agent for organic fillers include epoxy-modified polyolefins and maleic-acid-modified polyolefins. The amount of the compatibilizing agent to be added is preferably 0.05-10 parts by weight per 100 parts by weight of the organic filler.

In the case where the label is required to have transparency for making the color of the container prominent, the thermoplastic resin film base layer (I) is preferably as follows. Preferred examples of the base layer (I) include a stretched resin film comprising: a biaxially stretched film core layer (A) made of a resin composition comprising 5-30% by weight inorganic fine powder, 3-20% by weight high-density polyethylene, and 92-50% by weight propylene resin; a uniaxially stretched film front layer (B) bonded to one side of the core layer (A) and made of a resin composition comprising 35-65% by weight inorganic fine powder, 0-10% by weight high-density polyethylene, and 55-35% by weight propylene resin; and a uniaxially stretched film back layer (C) bonded to the core layer (A) on the side opposite to the front layer (B) and made of a resin composition comprising 35-65% by weight inorganic fine powder, 0-10% by weight high-density polyethylene, and 55-35% by weight propylene resin. Preferred examples thereof further include a stretched resin film comprising: a uniaxially stretched film core layer (A) made of a resin composition comprising 5-30% by weight inorganic fine powder, 3-20% by weight high-density polyethylene, and 92-50% by weight propylene resin; and a uniaxially stretched film front layer (B) bonded to one side of the core layer (A) and made of a resin composition comprising 35-65% by weight inorganic fine powder, 0-10% by weight high-density polyethylene, and 55-35% by weight propylene resin.

In the thermoplastic resin film base layer (I) comprising any of those stretched resin films, printing is conducted on the front layer (B) side and the heat-sealable resin layer (II) is formed on the core layer (A) or back layer (C) side. The density of the thermoplastic resin film base layer (I) is preferably in the range of 0.65-1.02 g/cm$^3$. The thickness of the thermoplastic resin film base layer (I) described above is in the range of generally 20-250 µm, preferably 40-200 µm. In case where the thickness thereof is smaller than 20 µm, label insertion into a mold with a label inserter is apt to arouse troubles due to insufficient stiffness, that the label is not fixed in a right position and the label rumples. Conversely, in case where the thickness of the base layer (I) exceeds 250 µm, the boundary between the container molded by in-mold forming and the label has a deep gap and this container has reduced strength in this area and has poor drop strength. In the case where the thermoplastic resin film base layer (I) has a multilayer structure as described above, the thicknesses of the constituent layers are as follows. The thickness of the layer (A) is preferably 19-170 µm (more preferably 38-130 µm), that of the layer (B) is preferably 1-40 µm (more preferably 2-35 µm), and that of the layer (C) is preferably 0-40 µm (more preferably 0-35 µm).

The thermoplastic resin film base layer (I) is a layer contributing to printability, and should have ink receptibility in various printing techniques including sheet-feed offset printing, rotary offset printing, gravure printing, flexography, letterpress printing, and screen printing. Because of this, the wettability index of the surface of the thermoplastic resin film base layer (I) is preferably 34-74 mN/m, more preferably 42-72 mN/m. In case where the wettability index of the surface of the thermoplastic resin film base layer (I) is lower than 34 mN/m, ink receptibility is insufficient and the printing ink is apt to separate from the surface during blow molding. In case where the wettability index thereof exceeds 74 mN/m, labels cling to each other at their edges during punching and it is difficult to insert the labels one by one during blow molding.

Heat-Sealable Resin Layer (II)

The heat-sealable resin constituting the heat-sealable resin layer (II) in the invention has a degree of non-crystallinity as determined with a DSC at temperatures below 90° C. of 60-90% and comprises a copolymer of propylene and at least one α-olefin having 4-20 carbon atoms (hereinafter referred to as "α-olefin resin").

The degree of non-crystallinity as determined with a DSC at temperatures below 90° C. is preferably 65-90%, more preferably 70-88%. In case where the degree of non-crystallinity is lower than 60%, the label has poor adhesion to molded containers and is apt to peel off or have blisters. In case where the degree of non-crystallinity exceeds 90%, suitability for filling with hot contents is apt to become poor. The heat-sealable resin can contain a polyolefin wax, a tackifier resin, and a polyolefin resin usable in the thermoplastic resin film base layer (I). In the case where the heat-sealable resin comprises many kinds of thermoplastic resins, it is preferred that the α-olefin resin, i.e., a copolymer of propylene and at least one α-olefin having 4-20 carbon atoms, be the main component (be contained in a highest weight proportion).

The degree of non-crystallinity at temperatures below 90° C. in the invention is one determined using the following equation (1).

$$\text{Degree of non-crystallinity below } 90° \text{C.}(\%) = 100 - 100 \times (\text{quantity of heat of fusion at temperatures of } 90° \text{C. and higher})/(\text{quantity of heat of fusion in 100\% crystalline state}) \qquad (1)$$

Incidentally, the quality of heat of fusion of a propylene resin in a 100% crystalline state was taken as 209 J/g (*J. Appl. Polym. Sci.*, 87, 916, 2003), while the quantity of heat of fusion of an ethylene resin in a 100% crystalline state was taken as 277 J/g (*Polymer Handbook*, V-13, 4th edition).

The α-olefin resin is a propylene random copolymer or propylene block copolymer obtained by copolymerizing propylene and at least two comonomers selected from α-olefins having 4-20 carbon atoms. The propylene random copolymer is one comprising a propylene chain and one of more of such α-olefins randomly bonded thereto. This propylene random copolymer may additionally contain ethylene as a comonomer.

Examples of the α-olefins include α-olefins having 4-20 carbon atoms, such as, e.g., 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. Preferred are 1-butene, 1-pentene, 1-hexene, and 1-octene. From the standpoints of copolymerizability, profitability, etc., 1-butene and 1-hexene are more preferred.

Examples of the propylene random copolymer usable in the invention include propylene/1-butene random copolymers, propylene/1-hexene random copolymers, propylene/ethylene/1-butene random copolymers, and propylene/ethylene/1-hexene random copolymers. Preferred are propylene/1-butene random copolymers and propylene/ethylene/1-butene random copolymers.

In the case where the propylene random copolymer usable in the invention is a random copolymer of propylene and an α-olefin, the content of the α-olefin is preferably 11.5-25 mol %, more preferably 14-20 mol %, from the standpoint of low-temperature heat sealability or the stable production of the random copolymer.

In the case where the propylene random copolymer usable in the invention is a copolymer of propylene, ethylene, and an α-olefin, the total content of ethylene and the α-olefin is preferably 2.0-35 mol %, more preferably 6.5-26 mol %, especially preferably 8-23 mol %, from the standpoint of low-temperature heat sealability or food hygiene.

The propylene block copolymer in the invention is a propylene block copolymer comprising: a copolymer part (part X) in which repeating units derived from propylene (hereinafter referred to as "propylene repeating units") are randomly bonded to repeating units derived from ethylene (hereinafter referred to as "ethylene repeating units") and/or repeating units derived from at least one α-olefin (hereinafter referred to as "α-olefin repeating units"); and a copolymer part (part Y) in which propylene repeating units are randomly bonded to ethylene repeating units and/or α-olefin repeating units and which has a structure different from that of the part X.

Examples of the α-olefins having 4-20 carbon atoms for use in the invention include the same ones as those enumerated above. Examples of the propylene block copolymer for use in the invention include (propylene-ethylene)/(propylene-ethylene) block copolymers, (propylene-ethylene)/(propylene-1-butene) block copolymers, (propylene-1-butene)/(propylene-ethylene) block copolymers, (propylene-1-butene)/(propylene-1-butene) block copolymers, (propylene-1-butene)/(propylene-ethylene-1-butene) block copolymers, (propylene-ethylene)/(propylene-ethylene-1-butene) block copolymers, (propylene-ethylene-1-butene)/(propylene-ethylene) block copolymers, and (propylene-ethylene-1-butene)/(propylene-ethylene-1-butene) block copolymers. Preferred are (propylene-ethylene)/(propylene-ethylene) block copolymers, (propylene-ethylene)/(propylene-ethylene-1-butene) block copolymers, and (propylene-1-butene)/(propylene-ethylene-1-butene) block copolymers.

The propylene block copolymer usable in the invention preferably is a propylene block copolymer in which part X is a copolymer part comprising propylene repeating units and ethylene repeating units and optionally containing α-olefin repeating units and part Y, which differs in structure from part X, is a copolymer part comprising propylene repeating units and ethylene repeating units and optionally containing α-olefin repeating units.

In the case where part X of the propylene block copolymer usable in the invention is a copolymer part comprising propylene repeating units and ethylene repeating units and optionally containing α-olefin repeating units, the ethylene content therein is preferably 2-9 mol %, more preferably 4-7 mol %, from the standpoint of low-temperature heat sealability or the stable production of the propylene block copolymer.

The α-olefin content therein is preferably 0-16 mol % from the standpoint of transparency.

The content of part X in the propylene block copolymer usable in the invention is preferably 40-85% by weight, more preferably 45-80% by weight, from the standpoint of low-temperature heat sealability or the stable production of the propylene block copolymer.

The content of part Y in the propylene block copolymer usable in the invention is preferably 15-60% by weight, more preferably 20-55% by weight, from the standpoint of low-temperature heat sealability or stable production.

Especially preferably, the propylene block copolymer usable in the invention is a propylene block copolymer in which part X is a copolymer part comprising propylene repeating units (main component) and ethylene repeating units and part Y, which differs in structure from part X, is a copolymer part comprising propylene repeating units (main component) and ethylene repeating units.

The polyolefin wax usable in the invention is an ethylene homopolymer or a copolymer of ethylene and one or more α-olefins. Examples of the α-olefins include propylene, 1-butene, 1-pentene, 1-hexene, 4-methyl-1-pentene, and 1-octene. Preferred are propylene, 1-butene, 1-hexene, and 4-methyl-1-pentene.

Examples of the tackifier resin usable in the invention include rosin, alicyclic hydrogenated tackifiers, modified rosins or esters thereof (rosin esters), petroleum resins such as aliphatic petroleum resins, alicyclic petroleum resins, aromatic petroleum resins, and copolymer petroleum resins comprising an aliphatic component and an aromatic component, terpene resins, low-molecular styrene resins, alkylphenol resins, and isoprene resins. Preferred are rosin, rosin esters, petroleum resins, terpene resins, and the like. In the invention, these tackifier resins may be used alone or in combination of two or more thereof.

Other known additives for resins can be added to the heat-sealable resin layer (II) in the invention at will as long as the addition thereof does not impair the desired heat sealability. Examples of the additives include dyes, nucleating agents, plasticizers, release agents, antioxidants, flame retardants, and ultraviolet absorbers. The thickness of the heat-sealable resin layer (II) is in the range of preferably 0.5-20 μm, more preferably 1-10 μm. Thicknesses thereof smaller than 0.5 μm are undesirable because it is difficult for the heat-sealable resin layer (II) having such a small thickness to be melted during blow molding by the heat of the molten polyethylene or molten polypropylene in a parison or another form to tenaciously fusion-bond the label to the container as a molded article. Thicknesses of the layer (II) exceeding 20 μm are undesirable because the label in this case curls and is difficult to fix to a mold.

The heat-sealable resin layer (II) should sufficiently satisfy label/molded resin bonding performance. From this standpoint, the surface of the antistatic layer (III) to be formed on the heat-sealable resin layer (II) should have a wettability index of 32-54 mN/m, preferably 32-52 mN/m. When the wettability index thereof is 32 mN/m or higher, the label has an enhanced affinity for resin moldings and a practically useful bonding strength is obtained. However, in case where the wettability index thereof exceeds 54 mN/m, the surface polarity becomes excessively high and the label/molded resin bonding performance becomes insufficient. This label is hence apt to peel off. In this specification, the values of wettability index are ones obtained through a measurement made in accordance with "JIS K 6768 (1999): Plastic Films and Sheets/Wet Tension Testing Method".

As an antistatic agent for constituting the antistatic layer (III), use can be made of an antistatic agent such as a low-molecular antistatic agent, polymeric antistatic agent, electronic conduction type antistatic agent, or conductive filler. Examples of the low-molecular antistatic agent include glycerol fatty acid esters, alkylsulfonic acid salts, tetraalkylammonium salts, and alkylbetaines. Examples of the polymeric antistatic agent include acrylic polymers containing quaternary nitrogen, poly(ethylene oxide), poly(ethylenesulfonic acid) salts, and carbobetaine graft copolymers. Examples of the electronic conduction type antistatic agent include polypyrrole and polyaniline. Examples of the conductive filler include tin oxide and zinc oxide. The antistatic layer (III) preferably is one comprising a polymeric antistatic agent among those. The antistatic performance of the antistatic layer (III) is necessary for avoiding troubles, for example, that in sheet-feed offset printing, sheets do not stack up in order in the paper discharge part and that labels cling to each other in a punching step.

The heat-sealable resin layer (II) in the label of the invention can be embossed as described in JP-A-2-84319 and JP-A-3-260689 in order to prevent blistering in the blow molding of containers. The embossed pattern preferably is a reversed-gravure type pattern having, for example, 5-200 lines per 2.54 cm formed by embossing.

For mixing the resin ingredients for constituting the label of the invention, various known methods can be used. Although the methods are not particularly limited, temperatures for mixing and time periods of mixing are suitably selected according to properties of the ingredients to be used. Examples thereof include the mixing of ingredients in the state of being dissolved or dispersed in a solvent and the melt kneading method. The melt kneading method attains a satisfactory production efficiency. Specific examples include: a method in which a thermoplastic resin in a powder or pellet form is mixed with an inorganic fine powder and/or an organic filler and with additives by means of a Henschel mixer, ribbon blender, supermixer, or the like and the resultant mixture is melt-kneaded with a twin-screw kneading extruder, extruded into strands, and then cut to obtain pellets; and a method in which the mixture kneaded is extruded through a strand die in water and cut with a rotating blade attached to the die end. Examples thereof further include a method in which a dispersant in the form of a powder, liquid, or solution in either water or an organic solvent is first mixed with an inorganic fine powder and/or organic filler and this mixture is then mixed with another ingredient such as, e.g., a thermoplastic resin.

The label of the invention can be produced by a combination of two or more of various techniques known to persons skilled in the art. Whatever methods the resin films were produced by, the label is within the scope of the invention as long as the resin films constituting the label satisfy the requirements specified in the claims.

For producing the label of the invention, use can be made of any of various known film production techniques or a combination of two or more thereof. Examples thereof include the casting method in which one or more molten resins are extruded into a sheet form with a single-layer or multilayer T-die connected to one or more screw extruders, the film-stretching method in which void generation by stretching is utilized, the rolling or calendaring method in which voids are generated during rolling, the expansion method in which a blowing agent is used, a method in which particles having voids are utilized, the inflation method, the solvent extraction method, and a method in which a component of a mixture is extracted by dissolution. Preferred of these is the film-stretching method.

Various known methods can be used for stretching. Stretching can be conducted at a temperature in a range suitable for the thermoplastic resin. Namely, when the resin is a non-crystalline resin, the temperature is not lower than the glass transition temperature of the thermoplastic resin used. When the resin is a crystalline resin, the temperature is in the range of from the glass transition temperature of non-crystalline parts of the resin to the melting point of crystalline parts thereof. Specifically, stretching can be conducted by longitudinal stretching utilizing peripheral-speed differences among rolls, transverse stretching utilizing a tenter oven, rolling, inflation stretching in which a tubular film is stretched with a mandrel, simultaneous biaxial stretching with a combination of a tenter oven and a linear motor, or the like.

Stretch ratio is not particularly limited, and is suitably determined while taking account of the intended use of the resin film of the invention, properties of the thermoplastic resin used, etc. For example, in the case where a propylene homopolymer or a copolymer thereof is used as the thermoplastic resin, the stretch ratio in uniaxial stretching is generally about 1.2-12, preferably 2-10, and that in biaxial stretching is generally 1.5-60, preferably 10-50, in terms of areal ratio. In the case of using other thermoplastic resins, the stretch ratio in uniaxial stretching is generally 1.2-10, preferably 2-7, and that in biaxial stretching is generally 1.5-20, preferably 4-12, in terms of a real ratio.

The stretching temperature may be a temperature lower by 2-160° C. than the melting point of the thermoplastic resin used. In the case where a propylene homopolymer or a copolymer thereof is used as the thermoplastic resin, the stretching temperature preferably is a temperature lower than the melting point of the resin by 2-60° C. In this case, the stretching speed is preferably 20-350 m/min. According to need, the label which has undergone stretching may be further subjected to a heat treatment at a high temperature.

The porosity of the label to be used in the invention can be controlled by regulating the content of the inorganic fine powder and/or organic filler and by regulating the stretch ratio. The porosity of the label is higher than 10% and not higher than 70%, and is preferably 15-60%.

The term "porosity" as used in the invention means the value calculated using the following equation (2). In equation (2), $\rho_0$ represents true density and $\rho$ represents the density of the label comprising a stretched film (determined in accordance with JIS-K-7112). The true density is almost equal to the density of the label which has not been stretched, as long as the material which has not been stretched is not one containing a large amount of air.

$$\text{Porosity}(\%) = 100 \times (\rho_0 - \rho)/\rho_0 \qquad (2)$$

($\rho_0$: true density of the label, $\rho$: density of the label)

The opacity of the label of the invention, as measured in accordance with JIS-P-8138, is higher than 20% and not higher than 100%, and is preferably 30-100%, more preferably 40-100%. Opacity in this specification is expressed in terms of percentage of the value obtained by dividing an opacity value measured by the method as provided for in JIS-P-8138, with a black plate placed on the back of the sample, by an opacity value measured by that method, with a white plate placed on the back of the sample.

The surface of the thermoplastic resin film base layer (I) can have a coat layer containing a pigment so as to have improved printability. The pigment coat layer can be formed by conducting pigment coating by a general coating technique for coat paper production. Examples of pigment coating materials usable for the pigment coating include one constituted of a latex comprising 30-80% by weight pigment for use in ordinary coat paper, such as clay, talc, calcium carbonate, magnesium carbonate, aluminum hydroxide, silica, calcium silicate, or a plastic pigment, and 20-70% by weight adhesive.

Examples of the adhesive for use in this coating include latexes of rubbers such as SBR (styrene/butadiene copolymer rubbers) and MBR (methacrylate/butadiene copolymer rubbers), acrylic emulsions, starch, PVA (poly(vinyl alcohol)), CMC (carboxymethyl cellulose), and methyl cellulose. Furthermore, a dispersant, e.g., a special poly(sodium carboxylate) such as an acrylic acid/sodium acrylate copolymer, and a crosslinking agent, e.g., a polyamide-urea resin, can be incorporated into those compounding ingredients. The pigment coating material may be used in the form of a water-soluble coating material having a solid concentration of generally 15-70% by weight, preferably 35-65% by weight.

In the label of the invention, the surface printability of the thermoplastic resin film base layer (I) or coat layer can be improved beforehand by an activation treatment according to need. The activation treatment may comprise at least one treatment selected from corona discharge treatment, flame treatment, plasma treatment, glow discharge treatment, and ozone treatment. Preferred are corona treatment and flame treatment. The amount of energy to be used for corona treatment is generally 600-12,000 J/m$^2$ (10-200 W·min/m$^2$), preferably 1,200-9,000 J/m$^2$ (20-150 W·min/m$^2$). When the amount thereof is 600 J/m$^2$ (10 W·min/m$^2$) or larger, the effect of corona discharge treatment can be sufficiently obtained and the subsequent application of an antistatic agent does not result in coating unevenness. On the other hand, even when the energy amount is increased beyond 12,000 J/m$^2$ (200 W·min/m$^2$), the effect of the treatment cannot be enhanced any more. Consequently, an energy amount up to 12,000 J/m$^2$ (200 W·min/m$^2$) suffices for corona treatment. In the case of flame treatment, the amount of energy to be used for the treatment is generally 8,000-200,000 J/m$^2$, preferably 20,000-100,000 J/m$^2$. When the amount thereof is 8,000 J/m$^2$ or larger, the effect of flame treatment can be sufficiently obtained and the subsequent application of an antistatic agent does not result in coating unevenness. On the other hand, even when the energy amount is increased beyond 200,000 J/m$^2$, the effect of the treatment cannot be enhanced anymore. Consequently, an energy amount up to 200,000 J/m$^2$ suffices for flame treatment. According to need, the surface of the heat-sealable resin layer (II) may be subjected to the activation treatment.

It is preferred that after the surface of the thermoplastic resin film base layer (I) or coat layer also has undergone the activation treatment, an antistatic layer should be formed on the treated layer as on the heat-sealable resin layer (II). The formation of an antistatic layer further improves suitability for paper feeding/discharge on a printing machine.

In the case where an antistatic layer is formed on the surface of the thermoplastic resin film base layer (I) or coat layer in the invention, this antistatic layer is one which comprises an antistatic agent in an amount of 0.001-10 g, preferably 0.002-8 g, more preferably 0.002-5 g, especially preferably 0.005-0.1 g, on a solid basis per unit area (m$^2$). In case where the amount of the antistatic agent is smaller than 0.001 g, a sufficient antistatic effect is not produced. In case where the amount thereof exceeds 10 g, the label surface has insufficient ink receptibility and the printing ink separates from the label during blow molding. Likewise, the antistatic layer (III) on the heat-sealable resin layer (II) contains an antistatic agent in an amount of 0.001-1 g, preferably 0.002-0.8 g, more preferably 0.005-0.5 g, on a solid basis per unit area (m$^2$). In case where the amount of the antistatic agent is smaller than 0.001 g, a sufficient antistatic effect is not produced as in the case shown above. In case where the amount thereof exceeds 1 g, adhesion strength between the heat-sealable resin layer (II) and a resin molding (container) decreases.

The antistatic layers for use in the invention can be formed by applying either a polymeric antistatic agent alone having the constitution (a) shown below or an aqueous solution containing the antistatic agent (a) and one or more ingredients having ink bondability, e.g., ingredients (b) and (c), mixed therewith in the proportions shown below based on the content of the ingredient (a), and drying the resultant coating.

Ingredient (a): Acrylic polymer containing tertiary or quaternary nitrogen; 100 parts by weight Ingredient (b): Polyimine compound; 0-300 parts by weight Ingredient (c): Epichlorohydrin adduct of polyamine-polyamide; 0-300 parts by weight The acrylic polymer containing tertiary or quaternary nitrogen, as ingredient (a), is obtained by copolymerizing 4-94% by weight ingredient (i), 6-80% by weight ingredient (ii), and 0-20% by weight ingredient (iii), which are monomers as described below.

Ingredient (i): At least one monomer selected from compounds represented by the following chemical formulae (I) to (VII):

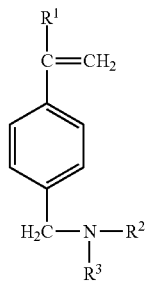

Chemical formula (I)

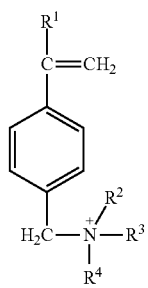

Chemical formula (II)

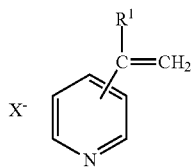

Chemical formula (III)

-continued

Chemical formula (IV)
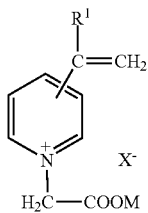

Chemical formula (V)
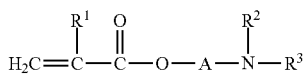

Chemical formula (VI)
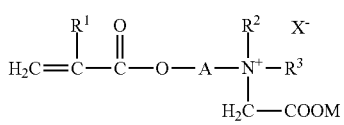

Chemical formula (VII)
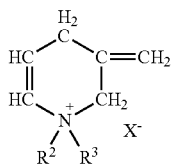

In formulae (I) to (VII), $R^1$ represents hydrogen or methyl; $R^2$ and $R^3$ each represent a lower alkyl group (having preferably 1-4 carbon atoms, especially preferably 1-2 carbon atoms); $R^4$ represents a saturated or unsaturated alkyl group having 1-22 carbon atoms or a cycloalkyl group; $X^-$ represents a counter anion (e.g., a halide, especially chloride) for the quaternized $N^+$; M represents an alkali metal ion (e.g., sodium or potassium); and A represents an alkylene group having 2-6 carbon atoms.
It is preferred to use one or more compounds represented by chemical formula (VI) among those monomers.
Ingredient (ii): (Meth)acrylic ester:

Chemical formula (VIII)
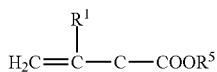

In the formula, $R^1$ represents hydrogen or methyl; and $R^5$ represents an alkyl group having 1-24 carbon atoms, an alkylene group, or a cycloalkyl group. Examples of the ester include butyl acrylate, capryl acrylate, and stearyl methacrylate.
Ingredient (iii): Other hydrophobic vinyl monomers:
Examples of the hydrophobic vinyl monomers include styrene and vinyl chloride.
Of the acrylic polymers containing tertiary nitrogen or quaternary nitrogen which are usable as ingredient (a), ones in which ingredient (i) is one or more monomers represented by chemical formula (VI) wherein $X^-$ is $Cl^-$ are water-soluble polymers showing especially preferred antistatic properties. Such water-soluble polymers are on the market under the trade names of "Suftomer ST-1000", "Suftomer ST-1100", "Suftomer ST-1300", and "Suftomer ST-3200", all manufactured by Mitsubishi Chemical Corp.
Ingredient (b): Polyimine compound; 0-300 parts by weight
The polyimine compound as ingredient (b) is a primer which enhances adhesion strength, and may exemplify, as a example, a polyimine compound selected from the group consisting of a poly(ethyleneimine) having a degree of polymerization of 200-3,000 represented by the following formula (IX), an ethyleneimine adduct of a polyamine-polyamide, alkyl-modified, alkenyl-modified, benzyl-modified, or alicyclic-hydrocarbon-modified compounds obtained by modifying those polyimine compounds with a halide such as an alkyl halide having 1-24 carbon atoms, alkenyl halide, cycloalkyl halide, or benzyl halide as a modifier, and a poly (ethyleneimine-urea). These polyimine compounds are described in detail in JP-B-2-2910 and JP-A-1-141736.

Chemical formula (IX)
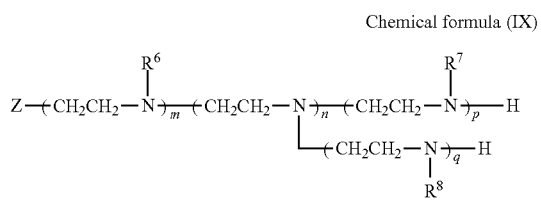

(In the formula, Z represents $-NH-R^9$ or a polyamine-polyamide residue; $R^6$ to $R^9$ each independently represent hydrogen, an alkyl or alkenyl group having 1-24 carbon atoms, a cycloalkyl group, or benzyl, provided that at least one is not hydrogen; m is a number of 0-300; and n, p, and q each represents a number of 1-300.)
Ingredient (c): Epichlorohydrin adduct of polyamine-polyamide; 0-300 parts by weight
The polyamine-polyamide/epichlorohydrin adduct as ingredient (c) also is a primer which enhances adhesion strength. Examples thereof include a water-soluble cationic thermosetting resin obtained by reacting a polyamide produced from a saturated dibasic carboxylic acid having 3-10 carbon atoms and a polyalkylene polyamine with epichlorohydrin. Such a thermosetting resin is described in detail in JP-B-35-3547. Examples of the saturated dibasic carboxylic acid having 3-10 carbon atoms include dicarboxylic acids having 4-8 carbon atoms, in particular, adipic acid.
Examples of the polyalkylene polyamine include polyethylene polyamines, in particular, ethylenediamine, diethylenetriamine, and triethylenetetramine. Of these, diethylenetriamine is preferred.
Besides those ingredients, other ingredients may be incorporated according to need. Examples of such optional ingredients include water-soluble inorganic compounds such as sodium carbonate, sodium sulfate, sodium sulfite, sodium thiosulfate, barium hydroxide, sodium metasilicate, sodium pyrophosphate, sodium tripolyphosphate, sodium primary phosphate, potash alum, ammonium alum, and ammonia, water-soluble organic solvents such as ethyl alcohol and isopropyl alcohol, surfactants, a polymerization agent such as ethylene glycol and poly (vinyl alcohol), and other auxiliary materials.
The proportions of ingredients (a), (b), and (c) to be mixed are as follows. The amount of the polyimine compound (b) is 0-300 parts by weight, preferably 0-200 parts by weight, and that of the polyamine-polyamide/epichlorohydrin adduct (c) is 0-300 parts by weight, preferably 0-200 parts by weight, per 100 parts by weight of the nitrogen-containing acrylic resin (a). By maintaining such composition, the surface of the olefin resin base layer and/or the surface of the heat-sealable resin layer can be made less apt to be electrostatically charged, whereby satisfactory suitability for sheet feeding/discharge is obtained. An aqueous solution of ingredients (a), (b), and (c) is prepared so as to have a total concentration of these ingredients of generally 0.1-10% by weight, preferably 0.1-5% by weight, on a solid basis and is used as an aqueous antistatic-agent solution (coating fluid).

For applying the aqueous antistatic-agent solution (coating fluid) to the surface of the heat-sealable resin layer (II) or the surface of the thermoplastic resin film base layer (I) or coat layer, use can be made of a coating technique such as die, bar, roll, gravure, spray, blade, air-knife, or size press coating or a combination of two or more of such coating techniques. According to the viscosity of the coating fluid, amount of the coating fluid to be applied, and coating speed, use can be made of: a method in which the coating fluid is metered in a specified amount with, e.g., a die, roll, gravure, or spray coater and transferred to a roll or size press and is then applied to the surface; a method in which the coating fluid is applied to the surface in an amount larger than a specified amount with a die or roll coater and the excess coating fluid is then scraped off with a bar, blade, air-knife, or the like to thereby apply the coating fluid in the specified amount; or a method in which the coating fluid is directly applied in a specified amount with, e.g., a die or spray coater. More specific examples of coating techniques in the case where the coating fluid has a viscosity of 10-1,000 cP (0.01-1 Ns/m$^2$) and is applied in an amount of 1-20 g/m$^2$ at a coating speed of 300 m/min or lower include offset gravure coating, a spray system, and rotor dampening. The offset gravure coating employs a combination of gravure coating and roll coating. In this technique, the coating fluid is transferred from a gravure roll to a roll, during which the gravure screen mark is removed and the coating fluid layer is smoothed. Thereafter, the coating fluid is transferred to the surface of each layer. In the spray system, which employs a combination of a sprayer and a size press, the coating fluid is supplied from a feeder through a spray coater to form an even coating fluid layer on a size press and this coating fluid layer is transferred from the size press to the heat-sealable resin layer. This technique is hence a preferred method for applying the coating fluid in a small amount. The rotor dampening is a kind of spray coating and is a technique in which the coating fluid is atomized with a rotor rotated at a high speed by belt driving and is directly sprayed on each layer.

After having been applied, the coating fluid may be smoothed or subjected to a drying step to remove the excess water and hydrophilic solvent according to need. Thus, an antistatic layer is obtained.

Printing can be conducted by a printing technique such as gravure printing, offset printing, flexography, or screen printing. With such a printing technique, a label bearing printed information such as, e.g., a bar code, manufacturer's name, seller's name, character, trade name, usage, etc. can be obtained. The label printed is separated by punching into labels of a necessary shape and dimensions. This label for in-mold forming may be one to be bonded to part of the surface of a container. In general, however, the label is produced as a blank to be used for surrounding the side wall of a container of a cup shape or as a label to be bonded to the front side and/or back side of a bottle-shape container in blow molding.

Holes and/or slits may be formed in the label of the invention.

In the case where holes are formed in the label of the invention, the diameter of the holes is preferably 0.05-1 mm, more preferably 0.1-0.5 mm. The pitch between adjacent holes is preferably 5-30 mm, and the holes preferably are through-holes. Methods of hole formation are not particularly limited. However, it is preferred to form holes by applying needles, electron beams, laser beams, or the like from the printed side or heat-sealable layer side of the label. In the case of forming holes with needles, the needles are not limited to conical needles and needles having any of various sectional shapes can be used, such as, e.g., needles of a trigonal pyramid or quadrangular pyramid shape or of a polyangular pyramid shape having a larger number of sides.

The pattern of those through-holes is not particularly limited as long as the through-holes arranged are capable of regulating the air permeability of the label to 10-20,000 sec.

In the case where slits are formed in the label of the invention to regulate air permeability, the length of the slits is preferably 0.5-20 mm, more preferably 1-15 mm. Slits having a length smaller than 0.5 mm tend to be insufficient in air permeability, while slits longer than 20 mm tend to give a labeled resin molding having a poor appearance because such slits are apt to open. The relationship between the length and pitch of the slits to be formed in the label is not particularly limited. In general, however, slits having a small length should be formed at a small pitch, whereas slits having a large length should be formed at a large pitch.

The slits to be formed in the label may have the same length and pitch, or may differ in length or pitch from one another. From the standpoint of simplifying label production steps to reduce the cost of production, it is preferred that all the slits to be formed in the label have the same length and same pitch.

Although the arrangement pattern of the slits to be formed in the label of the invention is not particularly limited, the slits are preferably formed in a lattice pattern arrangement. The slit pattern may be even throughout the label, or two or more slit patterns may coexist.

(In-Mold Forming)

The label for in-mold forming of the invention may be used in the following manners. The label is placed on the inner surface of the bottom female half of a mold for pressure-difference molding so that the printed side of the label is in contact with the mold surface. The label is then fixed to the inner wall of the mold half by suction. Subsequently, a sheet of a molten resin as a container-forming material is led to over the bottom female half and molded by pressure-difference molding in an ordinary manner to form a labeled resin container which has the label integrally fusion-bonded to the outer wall of the container. Although the pressure-difference molding may be either vacuum forming or pressure forming, it is generally preferred to conduct pressure-difference molding comprising a combination of the two molding techniques and utilizing plug assisting. This label is especially suitable for use as an in-mold label for blow molding in which a parison of a molten resin is pressed against the inner wall of a mold by pressurized air. In this process, the label is fixed in the mold and then united with the resin container being molded. Because of this, the labeled resin container thus produced is free from label deformation, has tenacious adhesion between the container main body and the label, and suffers no blistering. Thus, a container with a satisfactory appearance decorated with the label is obtained.

The container to be used in the invention preferably is a thermoplastic resin container, and more preferably comprises a polyolefin resin. Especially preferably, the polyolefin resin is a polypropylene resin.

The invention will be explained below in more detail by reference to Production Examples, Examples, and Test Examples. The materials, use amounts, proportions, details of treatments, treatment procedures, etc. shown in the following Examples can be suitably modified as long as the modifications do not depart from the spirit of the invention.

Consequently, the scope of the invention should not be construed as being limited to the following embodiments. In the Production Examples, Examples, and Comparative Examples, the degree of non-crystallinity at temperatures below 90° C. was determined with a DSC in the following manner. The DSC used was EXSTAR Type 6000, manufactured by SII Nano Technology Inc. In a nitrogen gas atmosphere having a flow rate of 30 mL/min, 5 mg of a sample weighed out was melted by heating from ordinary temperature to 300° C. at a heating rate of 10° C./min, held at 300° C. for 3 minutes, subsequently cooled to −60° C. at a cooling rate of 10° C./min to crystallize the sample, and then heated to 300° C. at a heating rate of 10° C./min to melt it. During the final melting, the quantity of heat of fusion was measured. The degree of non-crystallinity at the temperatures below 90° C. was determined using the following equation (1).

Degree of non-crystallinity below 90° C.(%)=100−100×(quantity of heat of fusion at temperatures of 90° C. and higher)/(quantity of heat of fusion in 100% crystalline state)  (1)

The quality of heat of fusion of a propylene resin in a 100% crystalline state was taken as 209 J/g (*J. Appl. Polym. Sci.*, 87, 916, 2003), while the quantity of heat of fusion of an ethylene resin in a 100% crystalline state was taken as 277 J/g (*Polymer Handbook*, V-13, 4th edition). Average surface roughness Ra was determined with a surface roughness meter (Surfcorder SE-30, manufactured by Kosaka Laboratory Ltd.). The values of MFR, density, and opacity were obtained through measurements made in accordance with JIS-K-6760, JIS-K-7112, and JIS-P-8138, respectively.

PRODUCTION EXAMPLE 1

Production of Label (1)

A resin composition (A) (shown in Table 2) composed of 65 parts by weight of PP1 described in Table 1, 10 parts by weight of HDPE described in Table 1, and 25 parts by weight of calcium carbonate described in Table 1 was melt-kneaded with an extruder and then extruded at 250° C. through a die into a sheet form. This sheet was cooled to about 50° C. This sheet was reheated to about 150° C. and then longitudinally stretched in a stretch ratio of 4 by means of peripheral-speed differences among rolls. Thus, a uniaxially stretched film was obtained.

On the other hand, a composition (B) (shown in Table 2) composed of 45 parts by weight of PP2 described in Table 1, 5 parts by weight of HDPE, 48 parts by weight of calcium carbonate, and 2 parts by weight of titanium oxide powder described in Table 1 was melt-kneaded with an extruder at 240° C. This melt was extruded through a die into a film form and superposed on a surface of the longitudinally stretched film. Thus, a front layer/core layer laminate (B/A) was obtained.

The composition (B) and pellets for heat-sealable resin layer formation (II-a) (shown in Table 2) consisting of 100 parts by weight of αPP described in Table 1 were separately melt-kneaded at 230° C. with respective extruders. The two melts were fed to one coextrusion die and superposed within the die. The αPP is an α-olefin resin comprising a copolymer of propylene and butene-1 and having a degree of non-crystallinity at temperatures below 90° C. of 79%. Thereafter, the resultant layered structure (B/II-a) was extruded into a film form through the die at 230° C. and laminated to the layer A side of the front layer/core layer laminate (B/A) so that the heat-sealable resin layer (II-a) faced outward.

This sheet was heated to 120° C. and then passed through embossing rolls comprising a metallic roll and a rubber roll (reversed-gravure type having 150 lines per inch) to form an embossed pattern comprising lines arranged at an interval of 0.17 mm on the heat-sealable resin layer side.

This four-layer film (B/A/B/II-a) was introduced into a tenter oven, heated to 155° C., and then stretched in the transverse direction with a tenter in a stretch ratio of 7. Subsequently, the film was heat-set at 164° C., cooled to 55° C., and trimmed. Furthermore, the front layer (layer B) side was subjected to corona discharge treatment at 50 W·min/m². Thereafter, an aqueous solution containing 0.5% by weight the following ingredient (a), 0.4% by weight the following ingredient (b), and 0.5% by weight the following ingredient (c) was applied to the front layer side with a size press in an amount of 0.01 g per unit area (m²) in terms of antistatic agent amount on a dry solid basis. Furthermore, an aqueous solution containing the following ingredient (a) was applied to the heat-sealable resin layer (II) side by spraying in an amount of 0.01 g per unit area (m²) in terms of antistatic agent amount on a dry solid basis. The coatings were dried to form an antistatic layer on each of the front and back sides. As a result, a label for in-mold forming was obtained which had a multilayer structure composed of antistatic layer/B/A/B/II-a/antistatic layer. Here, the "antistatic layer/B/A/B" corresponds to the thermoplastic resin film base layer (I), "II-a" corresponds to the heat-sealable resin layer (II), and the "antistatic layer" in contact with the II-a corresponds to the antistatic layer (III).

(a) Acrylic Terpolymer Containing Quaternary Nitrogen Made Up of the Following Units

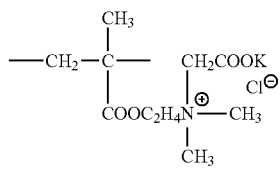

40% by weight

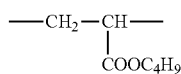

35% by weight

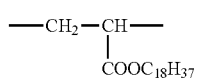

25% by weight (b) Butyl-Modified Poly(Ethyleneimine)

(AC-72 (trade name), manufactured by Mitsubishi Chemical Corp.)

(c) Epichlorohydrin Adduct of Water-Soluble Polyamine-Polyamide ("WS-4002" (trade name) manufactured by Seiko PMC Crop.)

The surfaces of the thermoplastic resin film base layer (I) and antistatic layer (III) were examined for wettability index. As a result, the wettability indexes thereof were found to be 70 mN/m and 34 mN/m, respectively.

Thus, a stretched resin film having a six-layer structure was obtained, which had a density of 0.77 g/cm³ and a thickness of 100 μm (antistatic layer/B/A/B/II-a/antistatic layer=ultrathin/30 μm/40 μm/25 μm/5 μm/ultrathin; determined through section examination with electron microscope).

The heat-sealable layer (II-a) side of this film had an average surface roughness (Ra) of 3.0 μm. Furthermore, this film had a porosity of 35% and an opacity as determined in accordance with JIS-P-8138 of 95%. The stretched resin film obtained by the process described above was cut into the half-kiku size (636 mm×470 mm) with a sheet cutter to obtain sheets for in-mold labels.

Subsequently, the front side of the thermoplastic resin film base layer (I) was subjected to UV offset four-color printing, and pieces of a label size (110 mm×90 mm) were punched out of the printed sheet. Thus, a label (1) was obtained.

TABLE 1

| Ingredient | Kind | Details | Density (g/cm³) | Melting point (°C.) | Degree of non-crystallinity below 90° C. (%) |
|---|---|---|---|---|---|
| Thermoplastic resin | propylene homopolymer 1 (PP1) | [trade name Novatec PP: FY4; Japan Polypropylene Corp.] (MFR (230° C., 2.16-kg load) = 5 g/10 min) | 0.90 | 164 | 58 |
| | propylene homopolymer 2 (PP2) | [trade name Novatec PP: MA3; Japan Polypropylene Corp.] (MFR (230° C., 2.16-kg load) = 11 g/10 min) | 0.90 | 165 | — |
| | high-density polyethylene (HDPE) | [trade name Novatec HD: HJ580; Japan Polyethylene Corp.] (MFR (190° C., 2.16-kg load) = 12 g/10 min) | 0.96 | 134 | — |
| | α-olefin-containing propylene copolymer (αPP) | [trade name Excellen: SPX78H2; Sumitomo Chemical Ltd.] (MFR (230° C., 2.16-kg load) = 7 g/10 min) | 0.89 | 125 | 79 |
| | α-olefin-containing ethylene copolymer (αPE) | [trade name Engage: 8401; Dupont Dow Elastomers Ltd.] (MFR (190° C., 2.16-kg load) = 30 g/10 min) | 0.89 | 76 | 100 |
| | low-density polyethylene (LDPE) | [trade name Novatec LD: LJ902; Japan Polyethylene Corp.] (MFR (190° C., 2.16-kg load) = 45 g/10 min) | 0.92 | 102 | 79 |
| | ethylene/vinyl acetate copolymer (EVA) | [trade name Novatec EVA: LV372; Japan Polyethylene Corp.] (MFR (190° C., 2.16-kg load) = 15 g/10 min) | 0.93 | 88 | 95 |
| Inorganic fine powder | calcium carbonate ($CaCO_3$) | heavy calcium carbonate having average particle diameter of 1.0 μm and specific surface area of 22,000 cm²/g [trade name Softon 2200; Bihoku Funka Kogyo Co., Ltd.] | 2.7 | — | — |
| | titanium oxide ($TiO_2$) | rutile titanium oxide [trade name Tipaque CR50; Ishihara Sangyo Kaisha, Ltd.] | 4.2 | — | — |

TABLE 2

| | | Thermoplastic resin | | | | | | | Inorganic fine powder | | Degree of non-crystallinity below 90° C. (%) |
|---|---|---|---|---|---|---|---|---|---|---|---|
| | | Propylene homopolymer | | High-density polyethylene | α-Olefin-containing propylene copolymer | α-Olefin-containing ethylene copolymer | Low-density polyethylene | Ethylene/vinyl acetate copolymer | Calcium carbonate powder (particle diameter, 1.0 μm) | Titanium oxide powder | |
| | | PP1 | PP2 | HDPE | αPP | αPE | LDPE | EVA | $CaCO_3$ | $TiO_2$ | |
| Resin composition (A) | | 65 pts. wt. | — | 10 pts. wt. | — | — | — | — | 25 pts. wt. | — | — |
| Resin composition (B) | | — | 45 pts. wt. | 5 pts. wt. | — | — | — | — | 48 pts. wt. | 2 pts. wt. | — |
| Resin composition (C) | | 80 pts. wt. | — | 10 pts. wt. | — | — | — | — | 10 pts. wt. | — | — |
| Resin composition (D) | | — | 73 pts. wt. | 5 pts. wt. | — | — | — | — | 20 pts. wt. | 2 pts. wt. | — |
| Resin composition (E) | | — | 37 pts. wt. | 5 pts. wt. | — | — | — | — | 55 pts. wt. | 3 pts. wt. | — |
| Pellets for heat-sealable resin layer (II) | II-a | — | — | — | 100 pts. wt. | — | — | — | — | — | 79 |
| | II-b | — | — | — | 705 pts. wt. | 30 pts. wt. | — | — | — | — | 84 |
| | II-c | 100 pts. wt. | — | — | — | — | — | — | — | — | 58 |
| | II-d | — | — | — | — | 70 pts. wt. | 30 pts. wt. | — | — | — | 92 |
| | II-e | — | — | — | — | — | — | 100 pts. wt. | — | — | 95 |

PRODUCTION EXAMPLE 2

Production of Label (2)

The same procedure as in Production Example 1 was conducted, except that an aqueous solution of the quaternary-nitrogen-containing acrylic terpolymer (a) was applied in an amount of 0.1 g per unit area ($m^2$) in terms of antistatic agent amount on a dry solid basis to form an antistatic layer (III) on the heat-sealable resin layer (II) side. Thus, a label (2) was obtained. The wettability indexes of the surfaces of the thermoplastic resin film base layer (I) and antistatic layer (III) were 70 mN/m and 50 mN/m, respectively.

PRODUCTION EXAMPLE 3

Production of Label (3)

The same procedure as in Production Example 1 was conducted, except that an aqueous solution containing 1.0% by weight the quaternary-nitrogen-containing acrylic terpolymer (a) and 0.5% by weight epichlorohydrin adduct of a water-soluble polyamine-polyamide (c) ("WS-4002" (tradename) manufactured by Seiko PMC Corp.) was applied in an amount of 0.01 g per unit area ($m^2$) in terms of antistatic agent amount on a dry solid basis to form an antistatic layer (III) on the heat-sealable resin layer (II) side. Thus, a label (3) was obtained. The wettability indexes of the surfaces of the thermoplastic resin film base layer (I) and antistatic layer (III) were 70 mN/m and 38 mN/m, respectively.

PRODUCTION EXAMPLE 4

Production of Label (4)

The same procedure as in Production Example 1 was conducted, except that an aqueous solution containing 0.5% by weight the quaternary-nitrogen-containing acrylic terpolymer (a), 0.4% by weight the butyl-modified poly(ethyleneimine) (b), and 0.5% by weight the epichlorohydrin adduct of a water-soluble polyamine-polyamide (c) was applied in an amount of 0.002 g per unit area ($m^2$) in terms of antistatic agent amount on a dry solid basis to form an antistatic layer on the thermoplastic resin film base layer (I) side. Thus, a label (4) was obtained. The wettability indexes of the surfaces of the thermoplastic resin film base layer (I) and antistatic layer (III) were 48 mN/m and 34 mN/m, respectively.

PRODUCTION EXAMPLE 5

Production of Label (5)

The same procedure as in Production Example 1 was conducted, except that pellets for heat-sealable resin layer formation (II-b) (shown in Table 2) obtained by melt-kneading a mixture of 70 parts by weight of αPP and 30 parts by weight of αPE described in Table 1 with a twin-screw extruder at 200° C., extruding the melt through a die into strands, and cutting the strands were used as a heat-sealable resin for forming a heat-sealable resin layer (II). Thus, a label (5) was obtained.

PRODUCTION EXAMPLE 6

Production of Label (6)

A resin composition (C) (shown in Table 2) composed of 80 parts by weight of PP1, 10 parts by weight of HDPE, and 10 parts by weight of calcium carbonate was melt-kneaded with an extruder and then extruded at 250° C. through a die into a sheet form. This sheet was cooled to about 50° C. This sheet was reheated to about 150° C. and then longitudinally stretched in a stretch ratio of 4 by means of peripheral-speed differences among rolls. Thus, a uniaxially stretched film was obtained.

On the other hand, a composition (D) (shown in Table 2) composed of 73 parts by weight of PP2, 5 parts by weight of HDPE, 20 parts by weight of calcium carbonate, and 2 parts by weight of titanium oxide powder was melt-kneaded with an extruder at 240° C. This melt was extruded through a die into a film form and superposed on a surface of the longitudinally stretched film. Thus, a front layer/core layer laminate (D/C) was obtained.

The composition (D) and pellets for heat-sealable resin layer formation (II-a) (shown in Table 2) consisting of 100 parts by weight of αPP described in Table 1 were separately melt-kneaded at 230° C. with respective extruders. The two melts were fed to one coextrusion die and superposed within the die. Thereafter, the resultant layered structure (D/II-a) was extruded into a film form through the die at 230° C. and laminated to the layer C side of the front layer/core layer laminate (D/C) so that the heat-sealable resin layer (II-a) faced outward. Subsequently, embossing and succeeding operations were conducted in the same manners as in Production Example 1. Thus, a label (6) was obtained.

PRODUCTION EXAMPLE 7

Production of Label (7)

A composition (E) (shown in Table 2) consisting of 37 parts by weight of PP2, 5 parts by weight of HDPE, 55 parts by weight of calcium carbonate, and 3 parts by weight of titanium oxide powder was used in place of the composition (B) for forming a front layer of the thermoplastic resin film base layer (I) in Production Example 1. The composition (E) was melt-kneaded with an extruder at 240° C., and this melt was extruded through a die into a film form and superposed on a surface of the longitudinally stretched film. Thus, a front layer/core layer laminate (E/A) was obtained.

The composition (E) and pellets for heat-sealable resin layer formation (II-a) (shown in Table 2) consisting of 100 parts by weight of αPP described in Table 1 were separately melt-kneaded at 230° C. with respective extruders. The two melts were fed to one coextrusion die and superposed within the die. Thereafter, the resultant layered structure (E/II-a) was extruded into a film form through the die at 230° C. and laminated to the layer A side of the front layer/core layer laminate (E/A) so that the heat-sealable resin layer (II-a) faced outward. Subsequently, embossing and succeeding operations were conducted in the same manners as in Production Example 1. Thus, a label (7) was obtained.

PRODUCTION EXAMPLE 8

Production of Label (8)

The same procedure as in Production Example 1 was conducted, except that no antistatic agent was applied on the heat-sealable resin layer (II) side and the antistatic layer (III) was omitted. Thus, a label (8) was obtained. The wettability indexes of the surfaces of the thermoplastic resin film base layer (I) and heat-sealable resin layer (II) were 70 mN/m and 30 mN/m, respectively.

PRODUCTION EXAMPLE 9

Production of Label (9)

The same procedure as in Production Example 1 was conducted, except that an aqueous solution of the quaternary-nitrogen-containing acrylic terpolymer (a) was applied in an amount of 3 g per unit area (m²) in terms of antistatic agent amount on a dry solid basis to form an antistatic layer (III) on the heat-sealable resin layer (II) side. Thus, a label (9) was obtained. The wettability indexes of the surfaces of the thermoplastic resin film base layer (I) and heat-sealable resin layer (II) were 70 mN/m and 60 mN/m, respectively.

PRODUCTION EXAMPLE 10

Production of Label (10)

The same procedure as in Production Example 1 was conducted, except that pellets for heat-sealable resin layer formation (II-c) (shown in Table 2) obtained by melt-kneading 100 parts by weight of PP1 described in Table 1 with a twin-screw extruder at 200° C., extruding the melt through a die into strands, and cutting the strands were used as a heat-sealable resin for forming a heat-sealable resin layer (II). Thus, a label (10) was obtained.

PRODUCTION EXAMPLE 11

Production of Label (11)

The same procedure as in Production Example 1 was conducted, except that pellets for heat-sealable resin layer formation (II-d) (shown in Table 2) obtained by melt-kneading a mixture of 70 parts by weight of αPE described in Table 1 and 30 parts by weight of LDPE with a twin-screw extruder at 200° C., extruding the melt through a die into strands, and cutting the strands were used as a heat-sealable resin for forming a heat-sealable resin layer (II). Thus, a label (11) was obtained.

PRODUCTION EXAMPLE 12

Production of Label (12)

The same procedure as in Production Example 1 was conducted, except that pellets for heat-sealable resin layer formation (II-e) (shown in Table 2) obtained by melt-kneading 100 parts by weight of EVA described in Table 1 with a twin-screw extruder at 200° C., extruding the melt through a die into strands, and cutting the strands were used as a heat-sealable resin for forming a heat-sealable resin layer (II). Thus, a label (12) was obtained.

EXAMPLES 1 TO 7 AND COMPARATIVE EXAMPLES 1 TO 5

The labels (1) to (12) produced in Production Examples 1 to 12 were used respectively in Examples 1 to 7 and Comparative Examples 1 to 5 as shown in Table 3. The labels for in-mold forming of the Examples and Comparative Examples and resin containers bearing these labels were examined and evaluated for properties by the following procedures.

(1) Determination of Properties (a) Wettability Index:

The label for in-mold forming obtained in each Production Example was examined for the wettability index of the thermoplastic resin film base layer (I) surface (α) and the wettability index of the antistatic layer (III) surface (β) using "ACCUDYNE TEST", manufactured by Diversified Enterprises, as a liquid mixture for testing. The results obtained are shown in Table 3.

(b) Thickness:

The thickness of the label obtained in each Production Example was measured by the method as provided for in JIS-P-8118 (1998). The results obtained are shown in Table 3. The thickness of each layer was determined from the proportions of the thicknesses of the layers through an examination of a thickness-direction section with an electron microscope (SEM)

(c) Density:

The density of the label obtained in each Production Example was determined by the method as provided for in JIS-K-7112 (1999). The results obtained are shown in Table 3.

(d) Porosity:

The porosity of the label obtained in each Production Example was calculated by the method described in the specification. The results obtained are shown in Table 3.

(e) Opacity:

The opacity of the label obtained in each Production Example was calculated by the method described in the specification based on the method as provided for in JIS-P-8138 (1976). The results obtained are shown in Table 3.

(2) Sheet-Feed Offset Printing

A thousand sheets of the half-kiku size (636 mm×470 mm) obtained in each Production Example were successively subjected to w offset four-color printing with offset printing machine "Lithrone", manufactured by Komori Corp., to print information and designs including a trade name, manufacturer's name, seller's name, character, bar code, usage, etc. in an environment of 23° C. and a relative humidity of 30% at a rate of 6,000 sheets per hour.

(f) Sheet Running Properties:

Printing was conducted under the conditions shown above. During this printing, the state of the sheets being fed and the degree in which the sheets stacked up in order in the sheet discharger after UV irradiation were judged based on the following criteria. The results obtained are shown in Table 3.

A: The sheets are smoothly fed and smoothly run through the printing machine, and satisfactorily stack up in order in the discharge part.

B: The sheets often arouse a trouble during sheet feeding, or do not stack up in order in the discharge part.

(g) Ink Receptibility:

Thereafter, the ink which had been dried with a UV irradiator was examined by applying "Cello Tape (registered trademark)", manufactured by Nichiban Co., Ltd., stripping the tape, and examining the state of the sheet surface. The ink receptibility was evaluated based on the following criteria. The results obtained are shown in Table 3.

A: The ink remains adherent; there are cases where the base layer itself breaks.

B: The ink is almost wholly separated although the stripping meets resistance; there is a practical problem.

C: The ink is wholly separated, with almost no resistance in the stripping.

(3) Label Punching (h) Suitability for Label Punching:

A hundred sheets which have undergone label printing were stacked up, and subjected to punching with a rectangular punch having a length of 110 mm and a width of 90 mm. The cut sides formed by the punching were examined for blocking. The results obtained are shown in Table 3.

A: No blocking occurs; there is no practical problem at all.
B: Blocking occurs; there is a practical problem.

(4) In-Mold Forming

A propylene homopolymer (Novatech PP "EG8", manufactured by Japan Polypropylene Corp.; melt flow rate at 230° C. and 2.16-kg load, 0.7 g/10 min; density, 0.953 g/m³) was used as a molding material for containers to conduct blow molding for producing single-layer resin containers bearing the labels of Examples 1 to 7 and Comparative Examples 1 to 5. A mold for a 3-liter container and a large direct-blow molding machine (TPF-706B, manufactured by Tahara Machinery Ltd.) were used for the molding under the conditions of a parison temperature of 200° C., mold cooling water temperature of 5° C., and in-mold resin container cooling time of 10 seconds while controlling the parison by regulating the gap between the die lips so as to result in an empty-container weight of 140 g. Each label was bonded so that the direction of the eyelets of the label was parallel to the mouth/bottom direction for the container.

Each label shown in Table 3 was inserted with an automatic inserter into the cavity of a split mold and placed on the inner surface of the barrel part of the mold. The label was fixed to the inner surface of the mold by suction through a suction hole, and a resin container bearing the label was produced by in-mold forming.

(i) Blistering:

The resin containers obtained were evaluated for suitability for practical use with respect to blistering. The suitability was judged based on the following criteria. The number of containers examined was 10. The results obtained are shown in Table 3.

A: Blistering occurs in none or one of the ten containers (on practical level).
B: Blistering occurs in two or three of the ten containers (on practical level).
C: Blistering occurs in four to seven of the ten containers (not on practical level).
D: Blistering occurs in eight to ten of the ten containers (not on practical level).

(j) Suitability for Filling with Hot Contents:

The resin containers judged to be on a practical level in the evaluation for practical use concerning blistering were examined in the following manner. Each container was filled with 90° C. hot water to the mouth and, at 30 seconds thereafter, the hot water was squeezed out to evaluated suitability for practical use with respect to filling with hot contents. The suitability was judged based on the following criteria. The results obtained are shown in Table 3.

A: The label after squeezing has neither peeled nor slid (on practical level).
B: The label after squeezing has suffered slight end peeling but has not slid (on practical level).
C: The label after squeezing has slid (not on practical level).
D: The label after squeezing has peeled off (not on practical level).

TABLE 3

| | Evaluation item | Unit | Example 1 | Example 2 | Example 3 | Example 4 | Example 5 | Example 6 | Example 7 |
|---|---|---|---|---|---|---|---|---|---|
| Label | Production Example | — | Prod. Ex. 1 | Prod. Ex. 2 | Prod. Ex. 3 | Prod. Ex. 4 | Prod. Ex. 5 | Prod. Ex. 6 | Prod. Ex. 7 |
| | Label bonded | — | label (1) | label (2) | label (3) | label (4) | label (5) | label (6) | label (7) |
| | Pellets for heat-sealable resin layer | — | II-a | II-a | II-a | II-a | II-b | II-a | II-a |
| | Thickness | μm | 100 | 100 | 100 | 100 | 100 | 100 | 100 |
| | Density | g/cm³ | 0.77 | 0.77 | 0.77 | 0.77 | 0.77 | 0.85 | 0.70 |
| | Porosity | % | 35 | 35 | 35 | 35 | 35 | 15 | 50 |
| | Opacity | % | 95 | 95 | 95 | 95 | 95 | 30 | 98 |
| | Average surface roughness Ra on heat-sealable layer side | mm | 3.0 | 3.0 | 3.0 | 3.0 | 3.0 | 3.0 | 3.0 |
| | Wettability index (α) | mN/m | 70 | 70 | 70 | 48 | 70 | 70 | 70 |
| | Wettability index (β) | mN/m | 34 | 50 | 38 | 34 | 34 | 34 | 34 |
| Evaluation of practical performance | Sheet running property in sheet-feed offset printing | — | A | A | A | A | A | A | A |
| | Ink receptibility in sheet-feed offset printing | — | A | A | A | A | A | A | A |
| | Suitability for label punching | — | A | A | A | A | A | A | A |
| | Blistering inhibition in large-size direct blow molding | — | A | B | A | A | B | B | A |

TABLE 3-continued

| | | | | | | | | |
|---|---|---|---|---|---|---|---|---|
| Suitability for filling with hot contents | — | A | B | A | A | B | A | A |

| | Evaluation item | Comparative Example 1 | Comparative Example 2 | Comparative Example 3 | Comparative Example 4 | Comparative Example 5 |
|---|---|---|---|---|---|---|
| Label | Production Example | Prod. Ex. 8 | Prod. Ex. 9 | Prod. Ex. 10 | Prod. Ex. 11 | Prod. Ex. 12 |
| | Label bonded | label (8) | label (9) | label (10) | label (11) | label (12) |
| | Pellets for heat-sealable resin layer | II-a | II-a | II-c | II-d | II-e |
| | Thickness | 100 | 100 | 100 | 100 | 100 |
| | Density | 0.77 | 0.77 | 0.77 | 0.77 | 0.77 |
| | Porosity | 35 | 35 | 35 | 35 | 35 |
| | Opacity | 95 | 95 | 95 | 95 | 95 |
| | Average surface roughness Ra on heat-sealable layer side | 3.0 | 3.0 | 3.0 | 2.8 | 2.5 |
| | Wettability index (α) | 70 | 70 | 70 | 70 | 70 |
| | Wettability index (β) | 30 | 60 | 34 | 34 | 34 |
| Evaluation of practical performance | Sheet running property in sheet-feed offset printing | B | A | A | A | A |
| | Ink receptibility in sheet-feed offset printing | A | A | A | A | A |
| | Suitability for label punching | A | B | A | A | A |
| | Blistering inhibition in large-size direct blow molding | A | C | D | C | B |
| | Suitability for filling with hot contents | A | C | — | D | D |

According to the invention, a label for in-mold forming was obtained which can have satisfactory suitability for printing, cutting, and punching even in a low-humidity environment, gives blistering-inhibited labeled resin containers under in-mold forming conditions including short-time low-temperature mold cooling, and has high adhesion to the containers even when the containers are filled with high-temperature contents.

What is claimed is:

1. A label for in-mold forming which comprises a thermoplastic resin film base layer (I), a heat-sealable resin layer (II), and an antistatic layer (III), wherein
the thermoplastic resin film base layer (I) is a multilayered resin film comprising a biaxially stretched layer and a uniaxially stretched layer,
the heat-sealable resin layer (II) comprises a heat-sealable resin including a copolymer of propylene and butene-1, the heat-sealable resin having a degree of non-crystallinity below 90° C. of 65 to 90%, wherein the content of butene-1 in the propylene/butene-1 copolymer is 11.5 to 25 mol %,
the antistatic layer (III) comprises an antistatic agent in an amount of 0.001 to 1 g per unit area (m$^2$) and the surface of the layer has a wettability index (JIS-K-6768) of 32 to 54 mN/m, and
the label has a porosity higher than 10% and not higher than 70% and has an opacity (JIS-P-8138) higher than 20% and not higher than 100%,
wherein the degree of non-crystallinity below 90° C. (%)=100−100×(quantity of heat of fusion at temperatures of 90° C. and higher)/(quantity of heat of fusion in 100% crystalline state).

2. The label for in-mold forming of claim 1, wherein the heat-sealable resin layer (II) thermally melts to label a container through the antistatic layer (III).

3. The label for in-mold forming of claim 2, wherein the material of the container comprises a polypropylene resin.

4. The label for in-mold forming of claim 1, wherein the heat-sealable resin layer (II) is a resin film which has been stretched at least uniaxially.

5. The label for in-mold forming of claim 1, wherein the surface of the heat-sealable resin layer (II) is embossed.

6. The label for in-mold forming of claim 1, which has a coat layer on the surface of the thermoplastic resin film base layer (I), the coat layer containing a pigment.

7. The label for in-mold forming of claim 1, wherein the surface of the thermoplastic resin film base layer (I) is subjected to an activation treatment.

8. The label for in-mold forming of claim 6, wherein the surface of the coat layer is subjected to an activation treatment.

9. The label for in-mold forming of claim 1, further comprising an antistatic layer formed on the surface of the thermoplastic resin film base layer (I).

10. The label for in-mold forming of claim 6, further comprising an antistatic layer formed on the surface of the coat layer.

11. The label for in-mold forming of claim 9, wherein the antistatic layer formed on the surface of the thermoplastic resin film base layer (I) comprises an antistatic agent in an amount of 0.001 to 10 g per unit area ($m^2$).

12. The label for in-mold forming of claim 10, wherein the antistatic layer formed on the surface of the coat layer comprises an antistatic agent in an amount of 0.001 to 10 g per unit area ($m^2$).

13. The label for in-mold forming of claim 1, wherein the antistatic agent comprises a polymeric antistatic agent.

14. The label for in-mold forming of claim 1, wherein the antistatic layer (III) is formed by one or more coating techniques selected from the group consisting of die, bar, roll, gravure, spray, blade, air-knife, and size press coating.

15. The label for in-mold forming of claim 2, wherein a peel-off and misalignment of the label do not occur when the container with the label is filled with content of 90° C.

16. The label for in-mold forming of claim 1, which has at least one of holes and slits.

17. A labeled resin container, which is labeled with the label for in-mold forming of claim 1.

18. The labeled resin container of claim 17, wherein the container comprises a polypropylene resin.

19. A process for producing the label for in-mold forming of claim 1, which comprises producing the label for in-mold forming by a film-stretching method.

20. A process for producing the labeled resin container of claim 17, which comprises producing the labeled resin container by a blow molding method.

21. The label for in-mold forming of claim 9, wherein the antistatic layer formed on the surface of the thermoplastic resin film base layer (I) is formed by one or more coating techniques selected from the group consisting of die, bar, roll, gravure, spray, blade, air-knife, and size press coating.

22. The label for in-mold forming of claim 10, wherein the antistatic layer formed on the surface of the coat layer is formed by one or more coating techniques selected from the group consisting of die, bar, roll, gravure, spray, blade, air-knife, and size press coating.

* * * * *